Nov. 1, 1960    J. W. HOWARD    2,958,601
PROCESS FOR PRODUCTION OF BUTTERMILK
Filed June 5, 1958

INVENTOR
JAMES W. HOWARD
BY Kimmel & Crowell
ATTORNEYS

United States Patent Office 2,958,601
Patented Nov. 1, 1960

2,958,601

PROCESS FOR PRODUCTION OF BUTTERMILK

James Willard Howard, Atlanta, Ga., assignor to Miss Georgia Dairies, Inc., Atlanta, Ga.

Filed June 5, 1958, Ser. No. 740,107

1 Claim. (Cl. 99—59)

The present invention relates to the process for the production of buttermilk.

Buttermilk as produced by the old-fashioned, well known churning method has a distinctive, easily recognized flavor and appearance and is characterized by the inclusion of small flakes of butter, such as remain after the majority of the butter has been removed in the customary churn process of making butter. The objective of this present process is to produce buttermilk which has the distinctive flavor and appearance characteristics of regularly churned buttermilk, including specifically small flakes of butter dispersed through the buttermilk.

More particularly, the present invention relates to a process for the production of buttermilk in wholesale quantities with the buttermilk having the flavor and appearance characteristics of old-fashioned, or farm-style, churned buttermilk such as is the usual by-product in the making of butter.

Further objects and advantages of the present process will become apparent from the following specification, when considered in light of the attached drawings in which.

Figure 1:
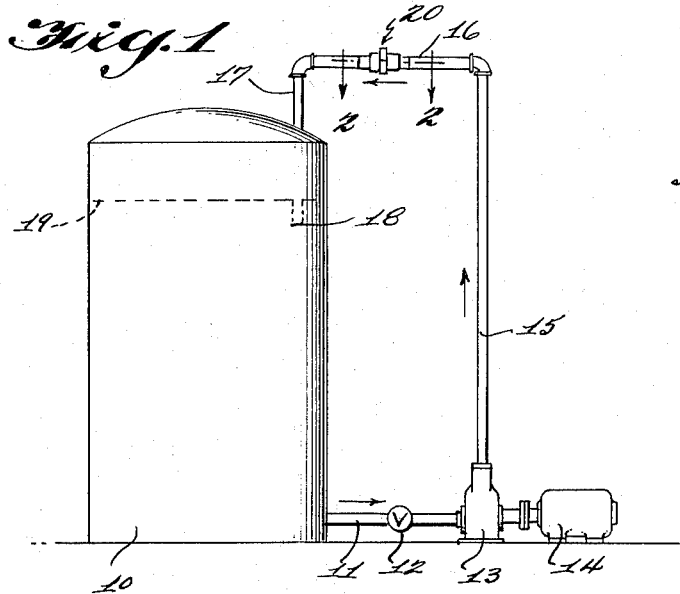
Figure 1 is a side elevation of the invention.

In the present process raw skim milk is placed in a large vessel or tank which, for present purposes, is usually an insulated vat or tank of 1,000 gallons capacity. Suitable means is provided for raising the temperature of the vat and its contents. The temperature of the contents is raised to 195 degrees Fahrenheit and kept at this temperature for one hour and fifteen minutes. At the end of this time the contents are cooled down to 72 degrees Fahrenheit and at this temperature a starter is added.

The temperatures referred to hereinafter are all reported in degrees Fahrenheit.

The starter may be lactic acid or other suitable starters. When lactic acid is used it is of sufficient quantity and character to produce .85 to .95 of one percent titratable acidity in the buttermilk. The contents of the vat are then held at a temperature of 72 degrees for from 12 to 16 hours. When the contents reach a titratable acidity of .95 to 1.00 of one percent titratable acidity, the curd which has formed is broken up by a suitable agitation process. This can be by a paddle, pump, or other means. After the curd is thoroughly broken up and dispersed throughout the mass, the contents of the vat are then cooled down to 62 degrees. At this point sweet cream is added in a quantity sufficient to equal a butter-fat content of one percent in the contents of the vat. Optionally, the sweet cream can be added to the skim milk when the latter is first placed in the vat, but the other method is preferred. After the sweet cream has been added, in the stated preferred process, the contents of the vat are subjected to a special action which will be referred to herein as a churning action. This action is continuous until the contents of the vat begin to show small flakes of butter throughout the mass. This churning action is then discontinued and the contents of the vat are cooled down to from 45 to 50 degrees, at which time the buttermilk is then suitable for packaging or bottling, and consumption. The special churning action before mentioned will now be hereinafter more specifically described by detailed reference to the drawings forming a part of the application.

A vat or tank 10 suitably insulated and of a desired capacity, such as, for example, one thousand gallons, is provided thereof with a horizontally extending pipe 11 having a hand controlled valve 12 mounted therein. The pipe 11 extends to and connects with a centrifugal pump 13 which is driven by an electric motor 14.

A pipe 15 extends upwardly from the centrifugal pump 13 in generally parallel relation to the tank 10 to a point above the upper end of the tank 10. A horizontal pipe 16 is connected to the upper end of the pipe 15 and extends to a point overlying the tank 10. A vertical pipe section 17 is connected to the end of the pipe 16 overlying the tank 10 and extends through the top of the tank 10 downwardly into the tank 10 to a point 18 below the level 19 of the liquid contents of the tank 10. The pipe 16 has a ground union 20 mounted therein and consisting of an internal threaded portion 21, a flange end portion 22, and a threaded clamping ring 23 which secures the flange portion 22 in engagement with the threaded portion 21.

Figure 2:
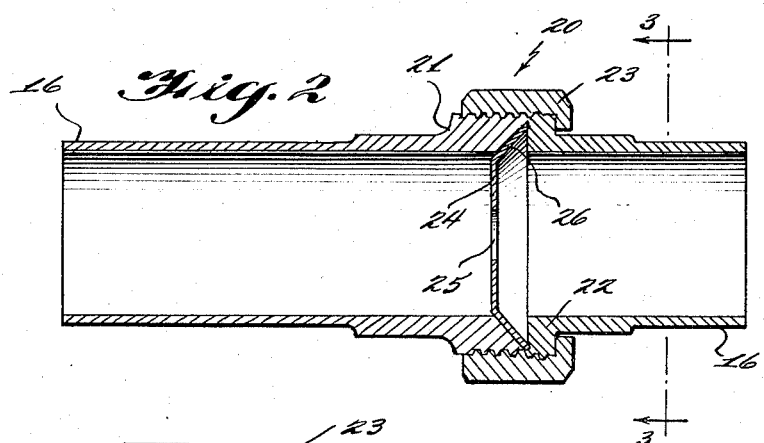
Figure 2 is an enlarged fragmentary vertical cross-section, taken along the line 2—2 of Figure 1, looking in the direction of the arrows.
Figure 3:
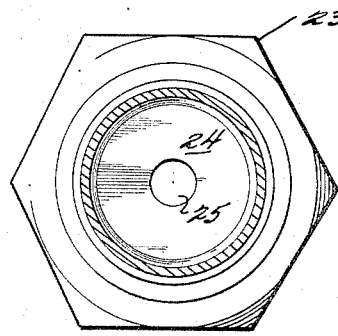
Figure 3 is a transverse cross section, taken along the line 3—3 of Figure 2, looking in the direction of the arrows.

An orifice plate 24 has an axial orifice 25 formed therein. An outwardly and upwardly sloping annular flange 26 is integrally formed on the edge of the orifice plate 24. The orifice plate 24 is positioned in transversely extending relation in the pipe 16 between the threaded portion 21 and the flange portion 22 and is secured therein by the clamping action of the clamping ring 23, as best illustrated in Figure 2. For purposes of illustration, assuming the pipe 16 to be of 1½ inch diameter, the orifice 25 would be approximately ⅜ inch in diameter.

The special churning action hereinbefore referred to is accomplished by the action of the pump 13 drawing the generally liquid contents from the tank 10 through the pipe 11 and forcing it through the pipes 15 and 16 through the orifice 25 and back into the upper end of the tank 10. It will be noted that the end of the pipe 17 extends into the tank 10 below the liquid level 19 thereof to thus ensure that as the contents are pumped into the tank 10, they will continuously, forcibly intermingle with and agitate the contents of the tank 10. A continuous circulation takes place and the result is that the contents of the tank 10 are thus subjected to a peculiar and novel churning action which is a combination of the forcible flow through the restricted orifice 25 in the pipe 16 and the agitation which takes place in the tank 10. This differs essentially from a mere ordinary recirculation splashing into and onto the contents of the vat or tank 10, as well as differing from a forcible mixing in a restricted chamber. A much better and more desirable product is produced than with any of the heretofore known processes of mass production of buttermilk. In short, this process results in a buttermilk, but of an improved quality and homogeneity.

Figure 5:
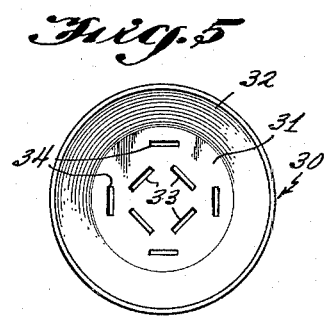
Figure 5 is a front elevation of a modified orifice plate removed from the fitting.
Figure 4:
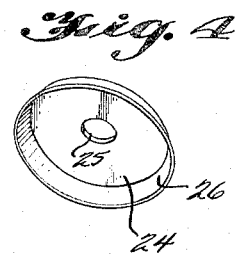
Figure 4 is a perspective view of the orifice plate removed from the fitting.

In Figure 5 a modified form of the invention is illustrated, which comprises an orifice plate 30 having a flat circular central portion 31. An outwardly and upwardly sloping annular flange 32 is integrally joined to the peripheral edge of the flat portion 31.

The flat central portion 31 of the orifice plate 30 is provided with a plurality of elongated generally rectangular orifices 33 arranged in circumferentially equispaced relation adjacent but equispaced from the center of the orifice plate 30. A second plurality of elongated generally rectangular orifices 34 are arranged in circumferentially equispaced relation intermediate the orifices 34 and spaced radially outwardly therefrom adjacent, but equispaced from the peripheral edge of the central portion 31.

The orifices 33 and the orifices 34 have a combined cross sectional area equal to the orifice 25 in the orifice plate 24.

The orifice plate 30 can either be used instead of the orifice plate 24 by mounting it in the ground union 20 or it can be used in conjunction with the orifice plate 24 by using a pair of ground unions 20 arranged in spaced apart relation in the pipe 16.

The use of the orifice plate 30 materially speeds the churning process without decreasing the quality of the buttermilk.

Having thus described the preferred process and apparatus for performing the invention, it should be understood that numerous structural modifications as well as changes in the process may be resorted to without departing from the scope of the appended claims.

What is claimed:

A process for the production of buttermilk including the steps of forming a skim milk and curdled cream mass by raising the temperature of skim milk to 195 degrees Fahrenheit, maintaining such temperature for 75 minutes, cooling the skim milk to 72 degrees Fahrenheit, adding to the skim milk a lactic acid starter of .85 to .95 of one percent titratable acidity, maintaining the skim milk and starter at 72 degrees Fahrenheit for from 12 to 16 hours until it reaches .95 to 1.00 percent titratable acidity, agitating the skim milk and starter to break the curds formed therein, cooling to 62 degrees Fahrenheit, adding sufficient sweet cream to provide a one percent butterfat content in a curdled skim milk and curdled cream mass, circulating the mass from one point of the mass to another point thereof while constructing a portion of the circulating mass by forcing the mass through a restricted orifice to an extent sufficient to achieve a churning action and to homogenize the mass until the mass shows a uniform dispersion of butter flakes.

References Cited in the file of this patent

UNITED STATES PATENTS

| | | |
|---|---|---|
| 2,209,516 | Fielder et al. | July 30, 1940 |
| 2,311,599 | Schwartz | Feb. 16, 1943 |
| 2,671,729 | Fear et al. | Mar. 9, 1954 |
| 2,712,299 | Strezynski | July 12, 1955 |
| 2,832,687 | Lane et al. | Apr. 29, 1958 |
| 2,868,516 | Mosley | Jan. 13, 1959 |